(12) United States Patent
Leung (10) Patent No.: US 11,194,114 B2
(45) Date of Patent: Dec. 7, 2021

(54) FILTER ASSEMBLY STRUCTURE

(71) Applicant: H&Y Digital Company Limited, Kowloon (HK)

(72) Inventor: Kwokfai Leung, Kowloon (HK)

(73) Assignee: H&Y Digital Company Limited, Kowloon (HK)

(*) Notice: Subject to any disclaimer, the term of this patent is extended or adjusted under 35 U.S.C. 154(b) by 64 days.

(21) Appl. No.: 15/993,566

(22) Filed: May 30, 2018

(65) Prior Publication Data

US 2018/0348467 A1     Dec. 6, 2018

(30) Foreign Application Priority Data

May 31, 2017 (CN) .......................... 201710401375.2

(51) Int. Cl.
| | | |
|---|---|---|
| *G02B 7/00* | (2021.01) | |
| *G03B 17/56* | (2021.01) | |
| *G03B 17/12* | (2021.01) | |
| *H04N 5/225* | (2006.01) | |
| *G03B 11/00* | (2021.01) | |

(52) U.S. Cl.
CPC ............. *G02B 7/006* (2013.01); *G03B 17/12* (2013.01); *G03B 17/565* (2013.01); *G03B 11/00* (2013.01); *H04N 5/2254* (2013.01)

(58) Field of Classification Search
CPC .......... G02B 7/006; G02B 5/20; G03B 17/12; G03B 17/565; G03B 11/00; G03B 17/00; G03B 17/566; G03B 17/14; G03B 2215/055; H04N 5/2254

USPC .......................................................... 359/892
See application file for complete search history.

(56) References Cited

U.S. PATENT DOCUMENTS

| | | | | |
|---|---|---|---|---|
| 9,661,200 | B2* | 5/2017 | O'Neill ................ | H04N 5/2254 |
| 10,054,846 | B1* | 8/2018 | Boerup ................. | F16M 13/02 |
| 2010/0183292 | A1* | 7/2010 | Neiman ................ | G03B 17/00 |
| | | | | 396/533 |
| 2015/0355431 | A1* | 12/2015 | Garvey ................. | G02B 7/003 |
| | | | | 359/819 |
| 2018/0054565 | A1* | 2/2018 | Smith ................ | H04N 5/23229 |

OTHER PUBLICATIONS

Parkin, Tim, Filter Systems for Neutral Density, Graduated and Polarising Filters, 167, On Landscape, 112-143.

* cited by examiner

*Primary Examiner* — Jade R Chwasz
(74) *Attorney, Agent, or Firm* — JCIP Global Inc.

(57) ABSTRACT

A filter assembly structure includes a filter holder and at least one filter, wherein the at least one filter is mounted on the filter holder using magnetic attraction. The filter assembly structure allows quick mounting and disassembling between the filter and the filter holder, and solves the problem of the filter getting stuck when the filter is being mounted on the conventional filter holder. The absence of the conventional slot reduces the thickness of the entire filter holder. Further, photograph vignetting is eliminated after the filter is mounted improving the photograph. The filter mounting is stable and reliable while also being very flexible and convenient to adjust by sliding up and down or turning left and right. Light leakage caused by a gap between the filters is reduced or eliminated improving the photographs produced with the filter assembly structure.

20 Claims, 7 Drawing Sheets

FILTER ASSEMBLY STRUCTURE

CROSS REFERENCE TO RELATED APPLICATIONS

Applicant H&Y Digital Company Limited a Hong Kong company principally located in Lai Chi Kok, Kowlon, Hong Kong states that this non-provisional utility patent application claims benefits from and priority to a patent application previously filed with the State Intellectual Property Office of the Peoples Republic of China in Chinese on May 31, 2017, said patent application assigned serial number CN201710401375.2 and incorporated by reference herein in its entirety.

TECHNICAL FIELD

The present invention relates to the technical field of photographic equipment and in particular, to a photographic filter assembly structure that facilitates the mounting and adjustment of a filter, to optical equipment, such as a camera. One of ordinary skill will appreciate that for the sake of brevity, the photographic filter assembly may simply be referred to herein as "a filter assembly structure" without departure from the scope of the invention.

STATEMENT REGARDING FEDERALLY SPONSORED RESEARCH OR DEVELOPMENT

No federal funds were used to develop or create the invention disclosed and described in the patent application.

BACKGROUND

With the maturation and improvement of photography technology, people's requirements on photography have also increased. Filters, such as UV (Ultra Violet) filters, polarizing filters, neutral density filters, starbursts and so on, have been widely used in field of professional photography and camera shooting, as a complementary way for professional photography.

CPL, which stands for Circular-Polarizing Filters in English, is used for increasing the color density, darkening blue sky, highlighting white clouds, and eliminating the reflected light reflected by non-metallic surfaces such as glass or water. It can also reduce the soft focus caused by atmospheric fog in the landscape photography, without changing the tone balance of the entire picture. When using CPL filters, the angle of the CPL filters needs to be adjusted at any time, and the CPL filters is often reversed. So there is a certain obstacle in the cooperation between the CPL filters and other filters, and the photographing effect is affected. In order to use and cooperate with different filters, and to achieve better creative photographing effect, a filter holder is required.

In the prior art, the filter holder is provided with a plurality of slots for mounting filter, and for at least one filter to be inserted and fixed. However, when the filter is inserted into the slot or when the filter is adjusted relative to the slot, it is easy to get stuck, which is inconvenient. The arrangement of the plurality of slots causes the entire filter holder to be relatively thick causing vignetting after the filter is inserted into the filter holder, which affects the photograph, particularly by the reduction of a photograph image's brightness or saturation toward the periphery compared to the photograph's image center. At the same time, due to environmental factors or the filter's own weight, the filter may loosen or may slide out when it is mounted in the slot, and it is difficult to fixed, and may even cause the glass filter to be broken, causing a costly loss to the user. In addition, the distance between the slots causes a gap between the filters, and thus causes light interference, thereby causing light leakage again affecting the photographing effect and quality of the photograph.

SUMMARY OF THE INVENTION

The object of the present invention is to solve the above technical problems at least to a certain extent.

The object of the present invention is to provide a filter assembly structure, which changes the way that a conventional filter is inserted into and fixed by a filter holder, using magnetic attraction to facilitate mounting and adjustment of the filter and to solve the problems of vignetting and light leakage arising during photographing using optical equipment, including a photographic camera.

To achieve the above-mentioned object, the present invention adopts the following technical solutions: a filter assembly structure, comprising a filter holder and at least one filter, wherein the at least one filter is mounted on the filter holder using magnetic attraction.

Using magnetic attraction, the present invention achieves quick mounting and disassembling between the at least one filter and the filter holder solving the phenomenon of getting stuck when the filter is being mounted on the conventional filter holder; and the cancelation of the conventional slot leads to that the thickness of the entire filter holder is greatly reduced and the vignetting will not happen after the filter is mounted, and the photographing effect is improved. When in use, the filter is not easy to slide down due to the quality of the conventional slot of the holder and the filter's own weight, and the mounting is stable and reliable. At the same time, the filter is very flexible and convenient when it is adjusted to slide up and down or to turn left and right. Due to the magnetic attraction, no light leakage occurs because of a gap between the filters, and the photographing effect is not affected.

In one embodiment, a fixed frame is provided around the filter, and a magnetic material is provided in the fixed frame. The filter holder is provided with a mounting area for mounting the filter, and at least the mounting area is made of a material that can be magnetically attracted to the magnetic material. In a way of magnetic attraction, the filter is not easy to slide off and be broken. However, the arrangement of the fixed frame leads to that, due to the buffering protection of the fixed frame, the filter is not easy to be broken even if the filter slides off due to an accident. At the same time, the design of the fixed frame can further ensure that there will be no gap between the filters, which prevents light leakage.

The magnetic material generally refer to substance that can directly generate magnetism, such as lodestone, magnetic rubber or metallic magnets, and so on. The magnetic material of the present invention is preferably a permanent magnetic material, to ensure long-term and reliable use. The material that can be magnetically attracted to the magnetic material includes a magnetic material, a non-magnetic iron-containing material, and a combination thereof, wherein the non-magnetic iron-containing material generally refers to a material that containing more than 40% of iron element, such as stainless iron, steel, iron plate, and so on.

Of course, in another embodiment, at least the mounting area of the filter holder may be made of a magnetic material, and a material that can be magnetically attracted to the magnetic material may be provided in the fixed frame, or the fixed frame may be made of the material that can be magnetically attracted to the magnetic material, as long as they meets the condition of magnetic attraction.

Preferably, the fixed frame comprises an upper frame, a lower frame, a left frame and a right frame, and the magnetic material is provided in at least the left frame and the right frame. The fixed frame is split into four sections, which are the upper, lower, left and right sections, such that they can be easily fixed around the filter respectively and can be easily assembled or disassembled. Normally, the magnetic material being provided just in the left frame and the right frame can ensure that the filter is firmly mounted on the filter holder. Of course, the magnetic material may also be provided in the upper frame and/or the lower frame, which can further increase the magnetic attraction force and lead to firmer mounting.

More preferably, the left frame and the right frame are respectively provided with a hollow groove and a first U-shaped groove, and the upper frame and the lower frame are respectively provided with a second U-shaped groove. Both ends of the upper frame and both ends of the lower frame are respectively provided with a convex block. The left frame and the right frame are respectively fitted with a left side and a right side of the filter via the first U-shaped groove, and the upper frame and the lower frame are respectively fitted with an upper side and a lower side of the filter via the second U-shaped groove. The magnetic material is provided in the hollow groove. The convex blocks are respectively inserted into both ends of the hollow groove such that the fixed frame is assembled. Such structure not only facilitates that the magnetic material is provided in the fixed frame, but facilitates the assembling and disassembling of the fixed frame itself, and the assembling and disassembling of fixed frame relative to the filter.

In a preferred embodiment, a double-sided tape is provided in the first U-shaped groove and/or the second U-shaped groove. That the double-sided tape is provided in the U-shaped grooves lead to a closer fit between the U-shaped groove and the edge of the filter. Ordinary glue is easily affected by temperature or other environmental factors, and thus causes stickiness failure. However, the stickiness of the double-sided tape is not easily affected, which ensures the longevity of use.

In a preferred embodiment, a depth of the first U-shaped groove and/or the second U-shaped groove is ranged from 1.5 mm to 2 mm. Depth value that is too low will cause the U-shaped groove to be fitted with the edge of the filter less closely, which causes that the filter slides off easily. Depth value that is too high will cause a decrease in the width of the filter, which causes vignetting to be formed easily during photographing. In addition, the thickness of the fixed frame is preferably 3 mm, and the thickness of both side walls of the U-shaped grooves is preferably 0.5 mm.

Preferably, at least the left frame or the right frame is provided with a scale. Since the shooting process requires a higher accuracy of position of the filter, the arrangement of the scale can facilitate that the position of the filter is adjusted by the user by sliding, and especially facilitate the adjustment within a small range, which reduces the adjustment error and improves the accuracy.

Preferably, only the mounting area is made of the material that can be magnetically attracted to the magnetic material. That is to say, except the mounting area, other areas are made of a material that cannot be magnetically attracted to the magnetic material. The mounting area is preferably a vertical rectangular area, and the width of which is preferably 5 to 10 mm. Since other areas are made of the material that cannot be magnetically attracted to the magnetic material, only the mounting area can be magnetically attracted to the fixed frame. When the fixed frame is not aligned with the mounting area, the filter cannot be mounted on the filter holder by the user. Such arrangement facilitates the mounting or the adjustment of the filter by the user.

In one embodiment, the filter assembly structure comprises at least two filters, and a hollow connecting ring being provided between the adjacent filters. The hollow connecting ring and the filters are fixed in a way of magnetic attraction. If two adjacent filters are directly magnetically attracted to each other, when one filter is rotated and adjusted relative to the other filter, the way of magnetic attraction gradually changes from surface contact to point contact, and the magnetic attraction force decreases sharply, which causes the filter to slides off easily. And the range of adjustment of rotation is limited due to point contact. Therefore, a hollow connecting ring is provided between the adjacent filters. When one filter is rotated and adjusted relative to the other filter, the way of the magnetic attraction between the two adjacent filters and the hollow connecting ring always remains as surface contact, and the magnetic attraction force can be kept constant, which ensures that the filter does not slide off during the adjustment process and is rotated and adjusted more precisely.

Preferably, the hollow connecting ring is a circular-shaped hollow connecting ring, and the hollow connecting ring is provided with a scale. The scale being provided along the hollow connecting ring facilitates the adjustment of the rotation of the angle of the filter by the user, and especially facilitates the adjustment within a small range, which reduces the adjustment error and improves the accuracy.

The present invention has following advantages:

In a way of magnetic attraction, the present invention achieves quick mounting and disassembling between the filter and the filter holder, and solves the phenomenon of getting stuck when the filter is being mounted on the conventional filter holder; and the cancelation of the conventional slot leads to that the thickness of the entire filter holder is greatly reduced and the vignetting will not happen after the filter is mounted, and the photographing effect is improved. When in use, the filter is not easy to slide down due to the quality of the conventional slot of the holder and the filter's own weight, and the mounting is stable and reliable. At the same time, the filter is very flexible and convenient when it is adjusted to slide up and down or to turn left and right. Due to the magnetic attraction, no light leakage occurs because of a gap between the filters, and the photographing effect is not affected.

The accompanying drawings are only for exemplary description, and shall not be construed as limiting the patent. In order to better illustrate the embodiments of the present invention, some parts are omitted, zoomed in or out in the accompanying drawings, but do not represent the actual size of the product. It is understandable for those skilled in the art that some known structures and the description thereof may be omitted in the accompanying drawings.

DETAILED DESCRIPTION OF THE PREFERRED EMBODIMENT

The present invention is further described with reference to the accompanying drawings and specific embodiment.

Embodiment 1

Figure 1:
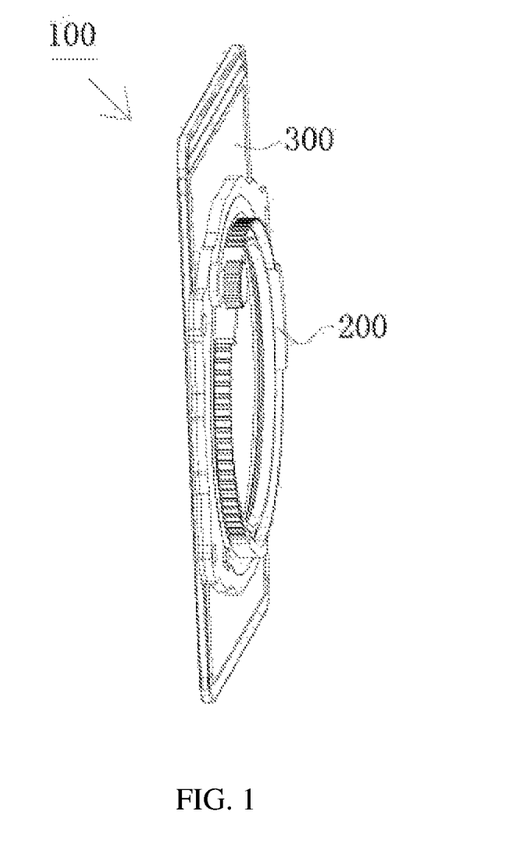
FIG. 1 is a schematic view shows how a filter assembly structure is assembled in embodiment 1 of the present invention.

As shown in FIG. 1, a filter assembly structure 100 of the present invention, comprises a filter holder 200 and a filter 300, wherein the filter 300 is mounted on the filter holder 200 in a way of magnetic attraction, so as to achieves quick mounting and disassembling between the filter 300 and the filter holder 200, and solves the phenomenon of getting stuck when the filter is being mounted on the conventional filter holder. The cancelation of the conventional slot leads to that the thickness of the entire filter holder is greatly reduced and the vignetting will not happen after the filter is mounted, and the photographing effect is improved. When in use, the filter 300 is not easy to slide down due to the quality of the conventional slot of the holder and the filter's own weight, and the mounting is stable and reliable. At the same time, the filter 300 is very flexible and convenient when it is adjusted to slide up and down or to turn left and right.

In the present embodiment, a fixed frame is provided around the filter 300, and a magnetic material is provided in the fixed frame. The filter holder 200 is provided with a mounting area (which is not shown) for mounting the filter 300, and at least the mounting area is made of a material that can be magnetically attracted to the magnetic material. The arrangement of the fixed frame leads to that, due to the buffering protection of the fixed frame, the filter is not easy to be broken even if the filter slides off due to an accident.

The magnetic material generally refer to substance that can directly generate magnetism, such as lodestone, magnetic rubber or metallic magnets. The magnetic material of the present invention is preferably a permanent magnetic material, to ensure long-term and reliable use. The material that can be magnetically attracted to the magnetic material includes a magnetic material, a non-magnetic iron-containing material, and a combination thereof, wherein the non-magnetic iron-containing material generally refers to a material that containing more than 40% of iron element, such as stainless iron, steel, iron plate, and so on.

In the present embodiment, only the mounting area is made of the material that can be magnetically attracted to the magnetic material. That is to say, except the mounting area, other areas are made of a material that cannot be magnetically attracted to the magnetic material. The mounting area is preferably a vertical rectangular area, and the width of which is preferably 5 to 10 mm. Since other areas are made of non-magnetic material, only the mounting area can be magnetically attracted to the fixed frame. When the fixed frame is not aligned with the mounting area, the filter 300 cannot be mounted on the filter holder 200 by the user. Such arrangement facilitates the mounting or the adjustment of the filter by the user.

Figure 2:
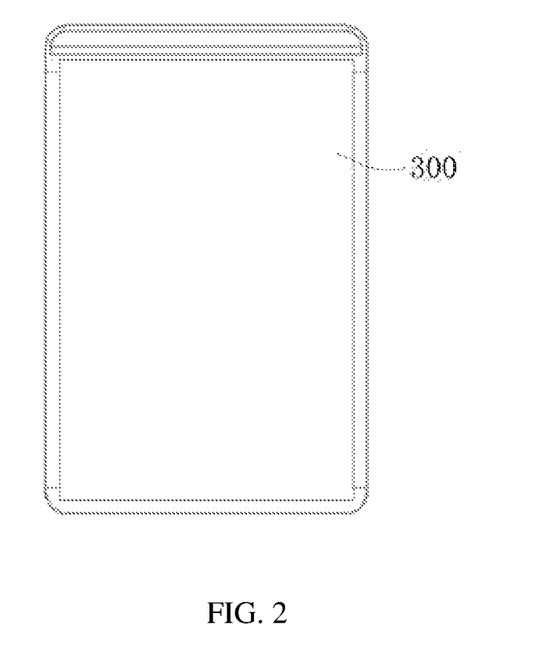
FIG. 2 is a schematic view shows how the filter and the fixed frame are assembled in embodiment 1 of the present invention.
Figure 3:
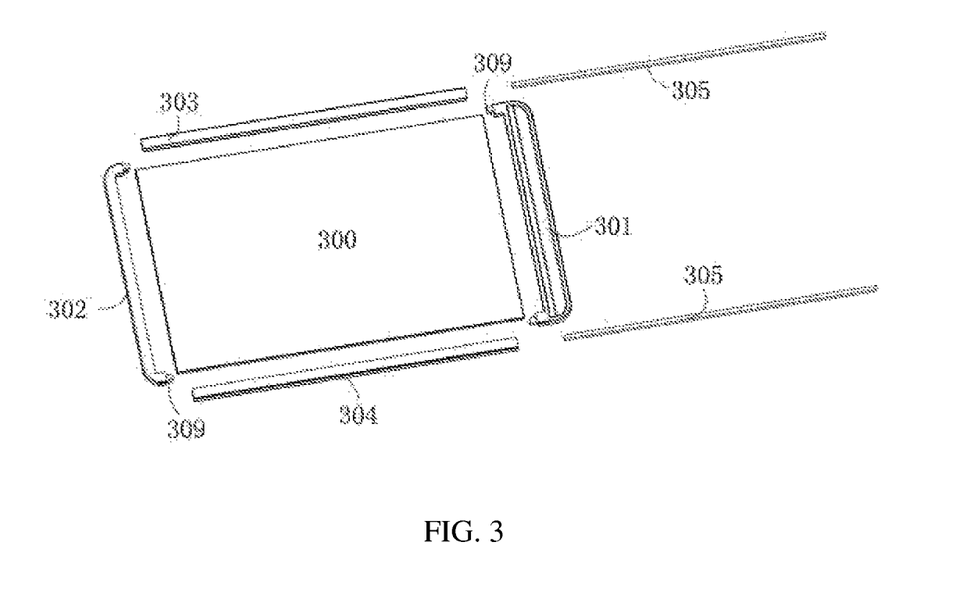
FIG. 3 is a schematic view shows how the filter and the fixed frame are disassembled in embodiment 1 of the present invention.

As shown in FIG. 2 to FIG. 3, in the present embodiment, the fixed frame comprises an upper frame 301, a lower frame 302, a left frame 303 and a right frame 304, and the magnetic material 305 is provided in at least the left frame 303 and the right frame 304. Normally, the magnetic material being provided just in the left frame can ensure that the filter is firmly mounted on the filter holder. Of course, the magnetic material may also be provided in the upper frame and/or the lower frame, which can further increase the magnetic attraction force and lead to firmer mounting.

As shown in FIG. 3 to FIG. 7, the left frame 303 and the right frame 304 are respectively provided with a hollow groove 306 and a first U-shaped groove 307, and the upper frame 301 and the lower frame 302 are respectively provided with a second U-shaped groove 308. Both ends of the upper frame 301 and both ends of the lower frame 302 are respectively provided with a convex block 309. The left frame 303 and the right frame 304 are respectively fitted with a left side and a right side of the filter 300 via the first U-shaped groove 307, and the upper frame 301 and the lower frame 302 are respectively fitted with an upper side and a lower side of the filter 300 via the second U-shaped groove 308. The magnetic material 305 is provided in the hollow groove 306. The convex blocks 309 are respectively inserted into both ends of the hollow groove 306 such that the fixed frame is assembled. Such structure not only facilitates that the magnetic material 305 is provided in the fixed frame, but facilitates the assembling and disassembling of the fixed frame itself, and the assembling and disassembling of fixed frame relative to the filter.

In the present embodiment, a double-sided tape is provided in the first U-shaped groove 307 and/or the second U-shaped groove 308. That the double-sided tape is provided in the U-shaped grooves lead to a closer fit between the U-shaped groove and the edge of the filter.

In the present embodiment, a depth of the first U-shaped groove 307 and/or the second U-shaped groove 308 is ranged from 1.5 mm to 2 mm. Depth value that is too low will cause the U-shaped groove to be fitted with the edge of the filter less closely, which causes that the filter slides off easily. Depth value that is too high will cause a decrease in the width of the filter, which causes vignetting to be formed easily during photographing. In addition, the thickness of the fixed frame is preferably 3 mm, and the thickness of both side walls of the U-shaped grooves is preferably 0.5 mm.

Figure 4:
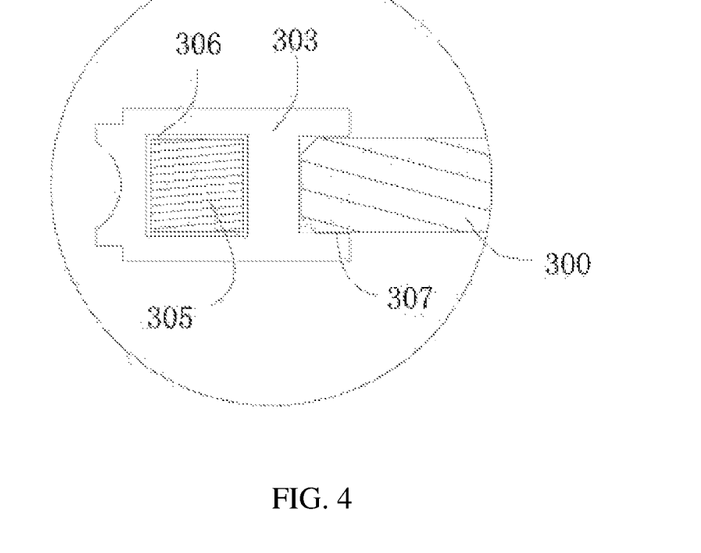
FIG. 4 is a schematic view partly shows how the filter and a left frame are assembled in embodiment 1 of the present invention.
Figure 5:
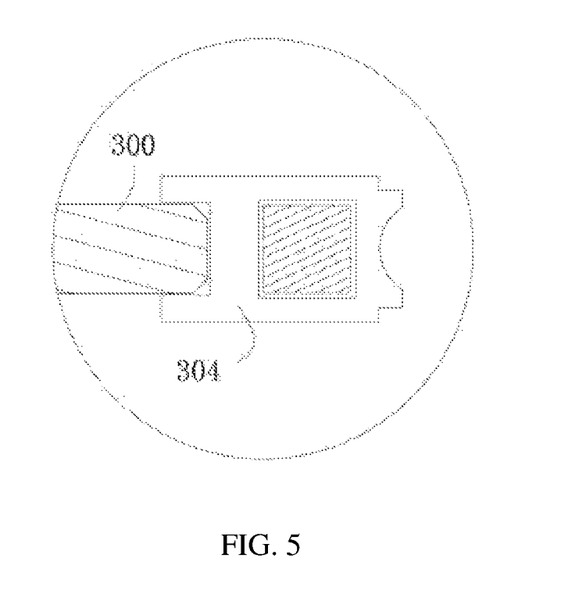
FIG. 5 is a schematic view partly shows how the filter and a right frame are assembled in embodiment 1 of the present invention.
Figure 6:
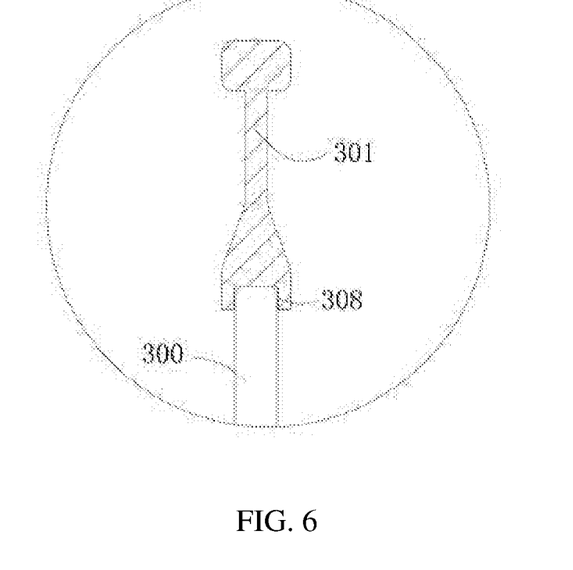
FIG. 6 is a schematic view partly shows how the filter and an upper frame are assembled in embodiment 1 of the present invention.
Figure 7:
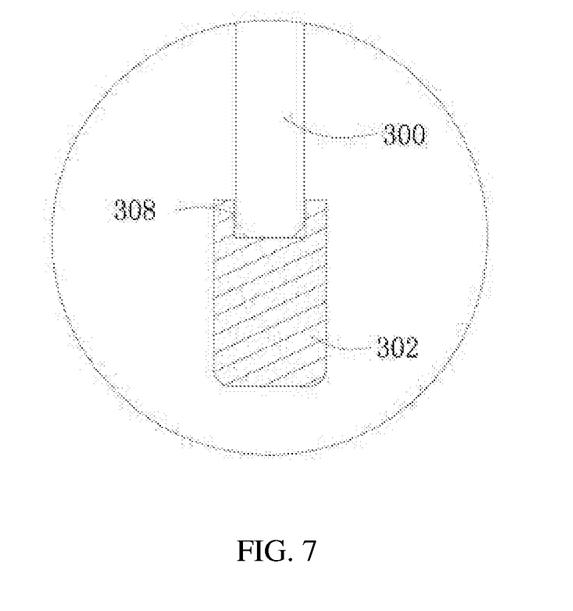
FIG. 7 is a schematic view partly shows how the filter and a lower frame are assembled in embodiment 1 of the present invention.

In the present embodiment, the left frame 303 or the right frame 304 is provided with a scale. Since the shooting process requires a higher accuracy of position of the filter, the arrangement of the scale can facilitate that the position of the filter is adjusted by the user by sliding, and especially facilitate the adjustment within a small range, which reduces the adjustment error and improves the accuracy.

Embodiment 2

Figure 8:
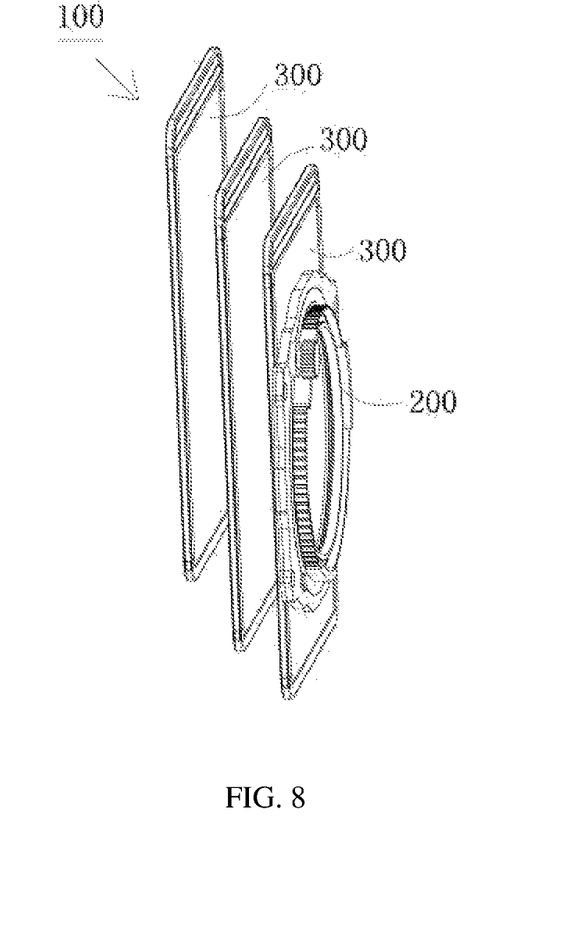
FIG. 8 is a schematic view shows how a filter assembly structure is assembled in embodiment 2 of the present invention.

The present embodiment differs from embodiment 1 in that: as shown in FIG. 8, the filter assembly structure 100 in the present embodiment comprises three filters 300, and the adjacent filters are fixed in a way of magnetic attraction.

As shown in FIG. 8, the filter holder is configured as a ring for attachment to the camera preventing abutment between the filter and the photographic camera.

Due to the magnetic attraction, no light leakage occurs because of a gap between the filters 300, and the photographing effect is not affected. At the same time, the design of the fixed frame can further ensure that there will be no gap between the filters 300, which prevent light leakage.

The rest of the structure is the same with embodiment 1.

Embodiment 3

Figure 9:
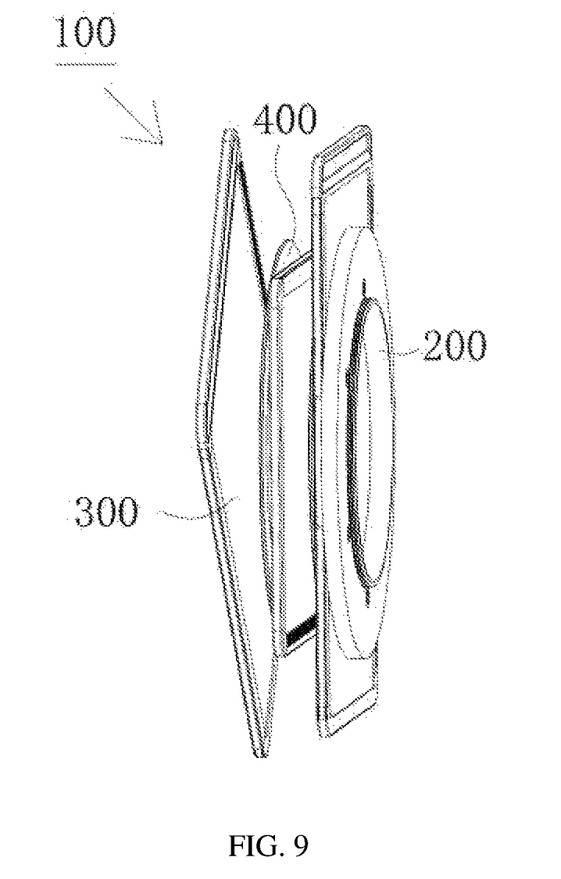
FIG. 9 is a schematic view shows how a filter assembly structure is assembled in embodiment 3 of the present invention.
Figure 10:
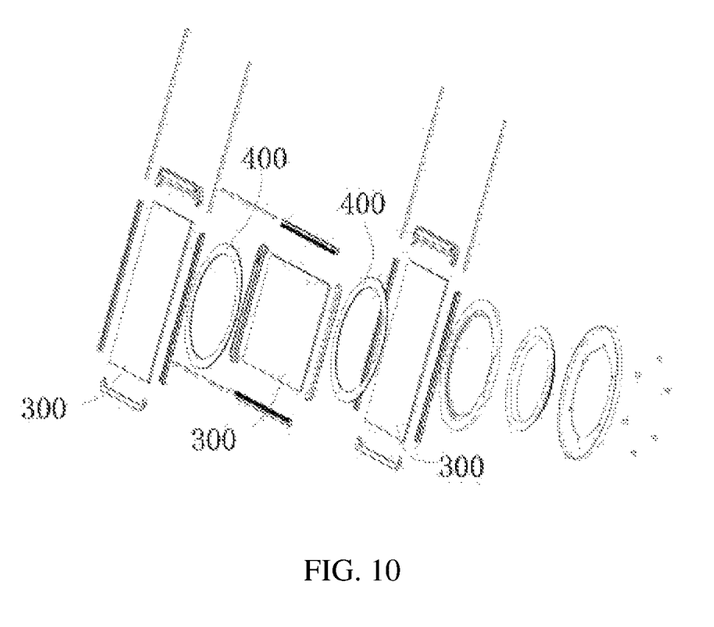
FIG. 10 is a schematic view shows how the filter assembly structure is disassembled in embodiment 3 of the present invention.

The present embodiment differs from embodiment 2 in that: as shown in FIGS. 9-10, in the present embodiment, a hollow connecting ring 400 is provided between the adjacent filters 300. The hollow connecting ring 400 and the filters 300 are fixed in a way of magnetic attraction. If two adjacent filters are directly magnetically attracted to each other, when one filter is rotated and adjusted relative to the other filter, the way of magnetic attraction gradually changes from surface contact to point contact, and the magnetic attraction force decreases sharply, which causes filter to slide off easily. And the range of adjustment of rotation is limited due to point contact. Therefore, a hollow connecting ring 400 is provided between the adjacent filters. When one filter is rotated and adjusted relative to the other filter, the way of the magnetic attraction between the two adjacent filters 300 and the hollow connecting ring 400 always remains as surface contact, and the magnetic attraction force can be kept constant, which ensures that the filter does not slide off during the adjustment process and is rotated and adjusted more precisely.

In the present embodiment, the hollow connecting ring 400 is a circular-shaped hollow connecting ring, and the hollow connecting ring 400 is provided with a scale. The scale being provided along the hollow connecting ring facilitates the adjustment of the rotation of the angle of the filter by the user, and especially facilitates the adjustment within a small range, which reduces the adjustment error and improves the accuracy.

The rest of the structure is the same with embodiment 2.

Apparently, the above-described embodiment of the present invention is just an embodiment for describing the present invention clearly, but not limitation to the implementations of the present invention. For those having ordinary skill in the art, variations or changes in different forms can be made on the basis of the above description. All of the implementations should not and could not be exhaustive herein. Any amendments, equivalent replacements and improvement made within the spirit and principle of the present invention shall all be included within the scope of protection of the claims of the present invention.

The invention claimed is:

1. A photographic filter assembly structure, comprising an attachable filter holder and at least one filter, wherein the at least one filter is mounted on the attachable filter holder in a way of magnetic attraction, when used after assembling the at least one filter and the attachable filter holder, the at least one filter is flexible when it is adjusted to slide up and down and to turn left and right relative to the attachable filter holder, wherein a shape of the at least one filter is different from a shape of the attachable filter holder, and the shape of the at least one filter is a rectangle, and the attachable filter holder has a circular-like shape, wherein the attachable filter holder is configured for exterior attachment to a photographic camera and wherein the configuration of the attachable filter holder prevents abutment between the filter and the photographic camera.

2. The photographic filter assembly structure according to claim 1, wherein a fixed frame is provided around the filter, and a magnetic material being provided in the fixed frame, and the attachable filter holder is provided with a mounting area for mounting the filter, at least the mounting area being made of a material that can be magnetically attracted to the magnetic material.

3. The photographic filter assembly structure according to claim 2, wherein the fixed frame comprises an upper frame, a lower frame, a left frame and a right frame, the magnetic material being provided in at least the left frame and the right frame.

4. The photographic filter assembly structure according to claim 3, wherein the left frame and the right frame are respectively provided with a hollow groove and a first U-shaped groove, and the upper frame and the lower frame are respectively provided with a second U-shaped groove, both ends of the upper frame and both ends of the lower frame being respectively provided with a convex block, the left frame and the right frame being respectively fitted with a left side and a right side of the filter via the first U-shaped groove, the upper frame and the lower frame being respectively fitted with an upper side and a lower side of the filter via the second U-shaped groove, the magnetic material being provided in the hollow groove, the convex blocks being respectively inserted into both ends of the hollow groove such that the fixed frame is assembled.

5. The photographic filter assembly structure according to claim 4, wherein a section of double-sided tape is provided in the first U-shaped groove and/or the second U-shaped groove.

6. The photographic filter assembly structure according to claim 4, wherein a depth of the first U-shaped groove and/or of the second U-shaped groove is ranged from 1.5 mm to 2 mm.

7. The photographic filter assembly structure according to claim 6, wherein the filter assembly structure comprises at least two filters, a hollow connecting ring being provided between the adjacent filters, the hollow connecting ring and the filters being fixed in a way of magnetic attraction.

8. The photographic filter assembly structure according to claim 7, wherein the hollow connecting ring is a circular-shaped hollow connecting ring, and the hollow connecting ring is provided with a scale, the scale configured to allow adjustment of the rotation of an angle of the filter.

9. The photographic filter assembly structure according to claim 4, wherein the filter assembly structure comprises at least two filters, a hollow connecting ring being provided between the adjacent filters, the hollow connecting ring and the at least two filters being fixed in a way of magnetic attraction.

10. The photographic filter assembly structure according to claim 9, wherein the hollow connecting ring is a circular-shaped hollow connecting ring, and the hollow connecting ring is provided with a scale, the scale configured to allow adjustment of the rotation of an angle of the filter.

11. The photographic filter assembly structure according to claim 3, wherein at least the left frame or the right frame is provided with a scale, the scale configured to allow slideable adjustment of the filter up and down.

12. The photographic filter assembly structure according to claim 11, wherein the filter assembly structure comprises at least two filters, a hollow connecting ring being provided between each of the adjacent filters, the hollow connecting ring and the at least two filters being fixed in a way of magnetic attraction.

13. The photographic filter assembly structure according to claim 3, wherein the filter assembly structure comprises at least two filters, a hollow connecting ring being provided between each of the adjacent filters, the hollow connecting ring and the at least two filters being fixed in a way of magnetic attraction.

14. The photographic filter assembly structure according to claim 13, wherein the hollow connecting ring is a circular-shaped hollow connecting ring, and the hollow connecting ring is provided with a scale, the scale configured to allow adjustment of the rotation of an angle of the filter.

15. The photographic filter assembly structure according to claim 2, wherein only the mounting area is made of the material that can be magnetically attracted to the magnetic material.

16. The photographic filter assembly structure according to claim 2, wherein the filter assembly structure comprises at least two filters, a hollow connecting ring being provided between the adjacent filters, the hollow connecting ring and the at least two filters being fixed in a way of magnetic attraction.

17. The photographic filter assembly structure according to claim 16, wherein the hollow connecting ring is a circular-shaped hollow connecting ring, and the hollow connecting ring is provided with a scale, the scale configured to allow adjustment of the rotation of an angle of the filter.

18. The photographic filter assembly structure according to claim 1, wherein the photographic filter assembly structure comprises at least two filters, a hollow connecting ring being provided between each of the adjacent filters, the hollow connecting ring and the at least two filters being fixed in a way of magnetic attraction.

19. The photographic filter assembly structure according to claim 18, wherein the hollow connecting ring is a circular-shaped hollow connecting ring, and the hollow connecting ring is provided with a scale, the scale configured to allow adjustment of the rotation of an angle of the filter.

20. A photographic filter assembly structure comprising:
a) an attachable filter holder and at least one filter, wherein the attachable filter holder is configured for exterior attachment to a photographic camera and the configuration prevents abutment between the filter and the photographic camera, wherein the at least one filter is mounted and affixed on the attachable filter holder via magnetic attraction between the attachable filter holder and the at least one filter, when used after assembling the at least one filter and the attachable filter holder, the at least one filter is flexible when it is adjusted to slide up and down and to turn left and right relative to the attachable filter holder, wherein a shape of the at least one filter is different from a shape of the attachable filter holder, and the shape of the at least one filter is a rectangle, and the attachable filter holder has a circular-like shape;
b) a fixed frame encloses the at least one filter, wherein the fixed frame further comprises an upper frame, a lower frame, a left frame and a right frame, wherein a magnetic material is present in the fixed frame, and the attachable filter holder is configured with a mounting area for mounting the filter, at least the mounting area being made of a material that can be magnetically attracted to the magnetic material, wherein the left frame and the right frame are respectively provided with a hollow groove and a first U-shaped groove, and the upper frame and the lower frame are respectively provided with a second U-shaped groove, wherein both ends of the upper frame and both ends of the lower frame being respectively provided with a convex block, the left frame and the right frame being respectively fitted with a left side and a right side of the filter via the first U-shaped groove, the upper frame and the lower frame being respectively fitted with an upper side and a lower side of the filter via the second U-shaped groove, the magnetic material being provided in the hollow groove, the convex blocks being respectively inserted into both ends of the hollow groove such that the fixed frame is assembled.

\* \* \* \* \*